Patented Dec. 20, 1932

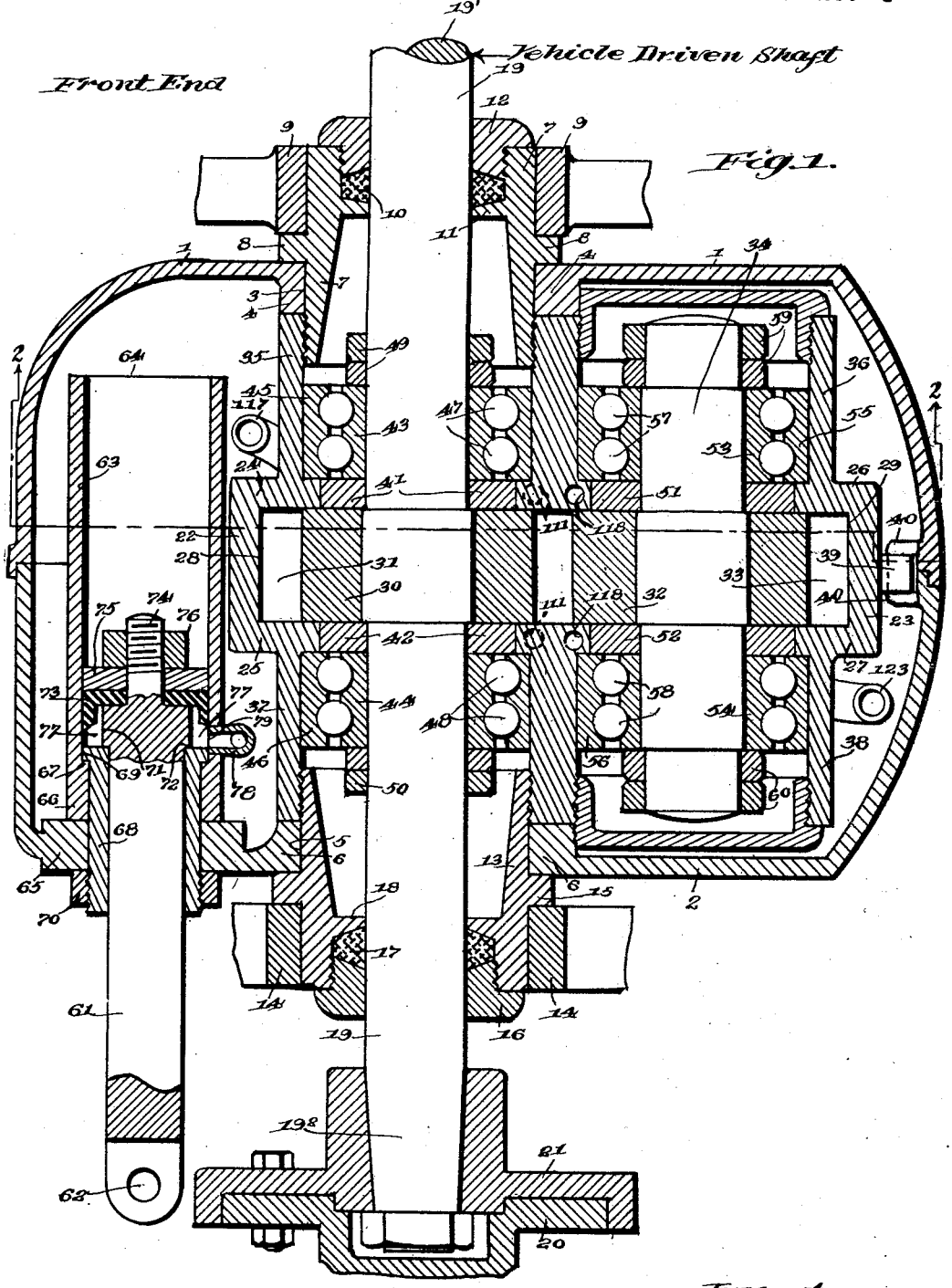

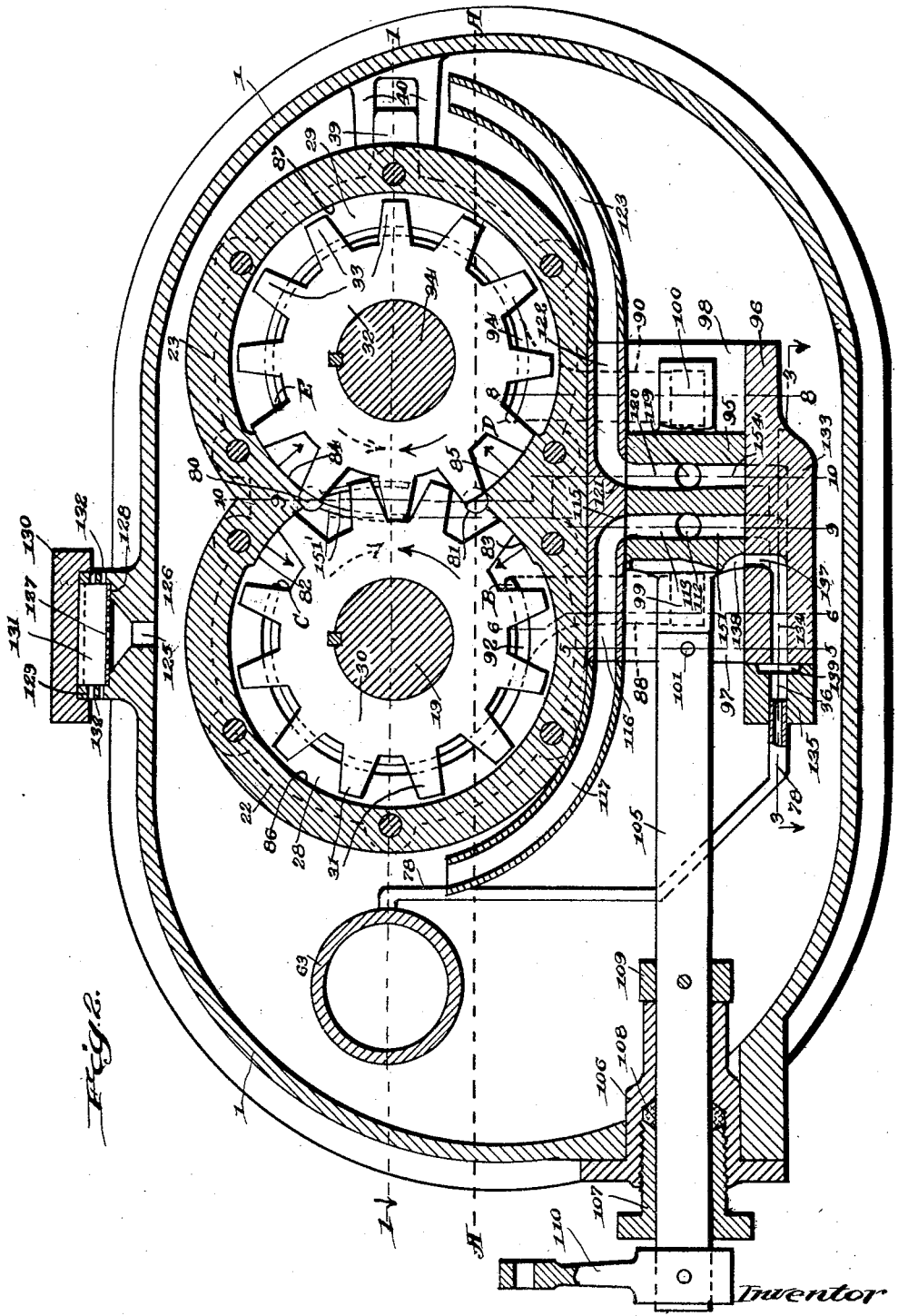

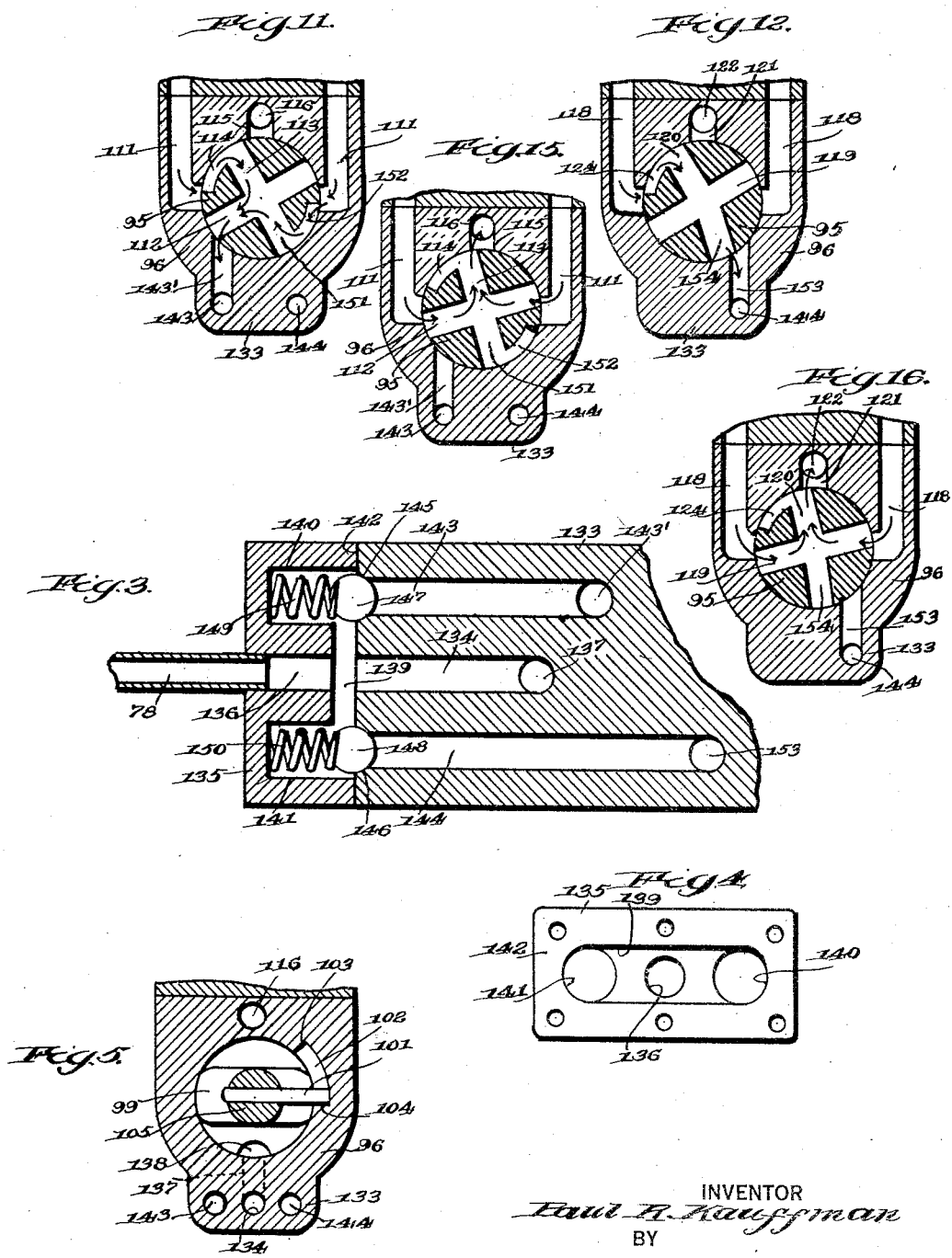

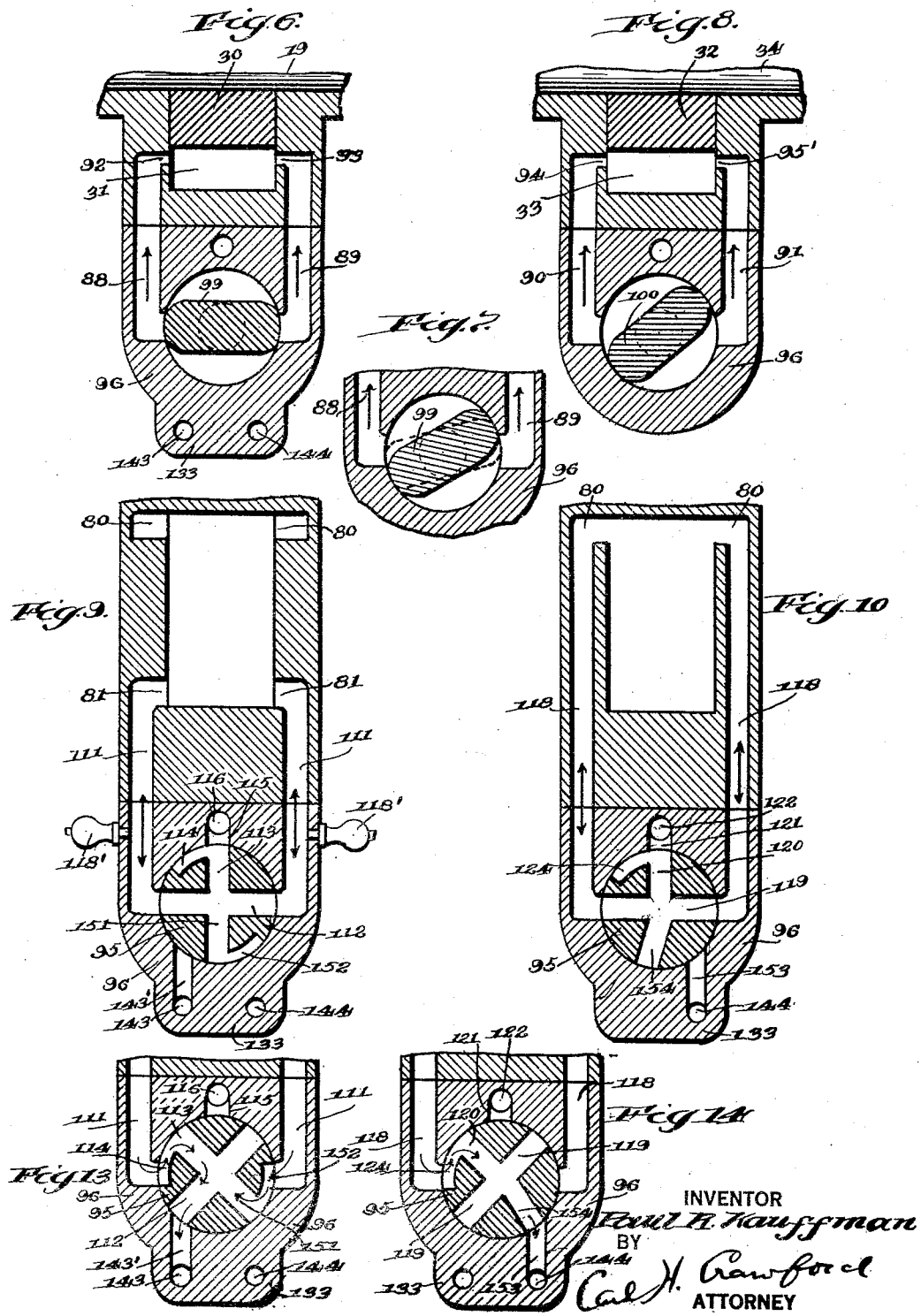

1,891,793

UNITED STATES PATENT OFFICE

PAUL R. KAUFFMAN, OF SEATTLE, WASHINGTON, ASSIGNOR TO McCLEARY HYDRAULIC BRAKE COMPANY, OF SEATTLE, WASHINGTON, A CORPORATION OF WASHINGTON

HYDRAULIC BRAKE

Application filed September 29, 1930. Serial No. 484,959.

This invention relates to improvements in hydraulic brakes for vehicles of any wheeled character.

One of the objects of this invention is to provide an ingress for the oil or other liquid medium to the gears in such a novel manner as to avoid resistance of centrifugal action of the rotating gears and the presence of air in the teeth pockets which normally acts to prevent free ingress of oil thereto.

A further feature consists in a novel oil admission in such consonance with centrifugal action as to employ the latter as an agency in causing the gear teeth pockets to be quickly filled.

An object of the invention is to house the meshing gears, or gear members, in such a manner as to provide a peripheral chamber or area about the gears wherein a low or substantially atmospheric pressure will always exist and which area will at all times be effectively closed to those areas in which oil pressure is being built up to apply brakage.

It is also a feature of the invention to provide a novel form of oil feed in such a manner that the brake will always be self-priming, in addition to and in combination with the feature of utilizing centrifugal action in delivering the oil to the gears.

A further object consists in localizing and controlling what has heretofore been destructive diametrical pressures that have tended to disrupt bearings and shafts, so that in the present form, such pressures will be prevented from exercising damaging strains.

A further object consists in a booster device adapted to operate band brakes under certain conditions and requirements wherein the hydraulic brake proper, requires auxiliary assistance, and in this connection, it is a feature to provide a hydraulic brake, which, in the act of building up a braking pressure, also functions to supply the booster with the required pressure when the booster is to be employed, and this feature is realized without a special pump or reservoir having the sole function of supplying the booster.

The invention embodies all the foregoing features in addition to the fact that all the foregoing functions are performed with equal facility either in resisting movement of the vehicle against forward or backward movement.

The invention has many other features and objects which will be more fully described in connection with the accompanying drawings and which will be more particularly pointed out in and by the appended claims.

In the drawings:—

Fig. 1 is a sectional view on line 1—1 of Fig. 2, looking in the direction of the arrow.

Fig. 2 is a sectional view on line 2—2 of Fig. 1, looking in the direction of the arrow.

Fig. 3 is a sectional view on line 3—3 of Fig. 2, looking downwardly.

Fig. 4 is a view of the valve head shown in Fig. 3.

Fig. 5 is a sectional view on line 5—5 of Fig. 2.

Fig. 6 is a sectional view on line 6—6 of Fig. 2, showing oil ingress shut off.

Fig. 7 is a view similar to Fig. 6, with oil ingress opened.

Fig. 8 is a sectional view on line 8—8 of Fig. 2, with oil ingress opened.

Fig. 9 is a sectional view on line 9—9 of Fig. 2, showing full egress portage registry for air when the valve is in a non-braking adjustment.

Fig. 10 is a sectional view on line 10—10 of Fig. 2, with the parts in a non-braking adjustment.

Fig. 11 is a sectional view similar to Fig. 9, when air egress has been shut off and the valve has been moved to a braking adjustment, against forward movement of the vehicle.

Fig. 12 is a view similar to Fig. 10, with the valve in a braking adjustment against rearward movement of the vehicle.

Fig. 13 is a view similar to Fig. 9, with the valve in a band brakage adjustment against forward movement of the vehicle.

Fig. 14 is a view similar to Fig. 10, with the valve in a band brakage adjustment against rearward movement of the vehicle.

Fig. 15 is a view similar to Fig. 11, with the valve in a light range braking adjustment against forward movement.

Fig. 16 is a view similar to Fig. 12, with the valve in a light range brakage adjustment against rearward movement of the vehicle.

Like characters of reference designates similar parts throughout the different figures of the drawings.

First referring more particularly to Figs. 1 and 2, I have shown a housing formed of half sections 1 and 2, of the general contour illustrated, which may be suitably rigidly connected in any desirable manner in oil tight connection. Section 1, which in the present construction, is the front section, as the brake would be mounted on a truck frame, is bored at 3, and provided with a suitable bearing 4. The rear section 2, is bored at 5, and forms a bearing 6. In the front section 1, is a combined gland and hanger boss 7, having a flange 8, adapted to abut the exterior of the housing and on which a hanger 9 is disposed, as shown, for supporting one part of the housing. The boss 7, extends inwardly of the bearing 4 and is shown exteriorly threaded. A suitable packing 10, is disposed between a flange 11, and a cap 12, the latter being threaded into the boss 7, as shown. On the rear section 2, a like construction is provided, the combined gland and hanger boss 13, being disposed in a hanger 14, and having a flange 15, abutting against the housing, and the boss extending inwardly and having an exteriorly threaded end. A cap 16 is threaded in the outer end of the boss 13, to force a suitable packing 17 against a flange 18, and consequently, radially inwardly, as is usual.

The vehicle drive shaft is indicated at 19 and the same extends through the housing and the combined gland and hanger bosses 7 and 13, as shown, the glands serving to prevent leakage of oil endwise of shaft 19 outwardly from the housing.

The forward end of the shaft, as indicated at 19' is adapted for connection in any suitable manner, or form an extension of the forward end of the drive shaft, and the rear end $19^2$ is provided with a suitable joint comprising male and female members 20 and 21, respectively, to afford a suitable connection with the rear end of the drive shaft, not shown, whereby braking action may be effected through the differential, not shown. As the manner in which the housing, comprising sections 1 and 2, is mounted on the truck frame, is not claimed in this application, it is not specifically shown, although it will be securely mounted to partake of or absorb frame weave, in any desired manner.

Inside of the housing, is a casing having peripheral wall portions 22 and 23, as shown more fully in Fig. 2, and side wall portions 24 and 25, and 26 and 27, as shown more fully in Fig. 1. These peripheral and side walls are formed to provide gear cavities 28 and 29. A gear 30, having teeth 31, is disposed in cavity 28, and is keyed or otherwise non-rotatively mounted in driven shaft 19, and a gear 32, having teeth 33, is disposed in cavity 29, and is mounted on an idle or idly running shaft 34. Said gears 30 and 32, are arranged and disposed to have mesh engagement, as shown in Fig. 2, and when said gears are vehicularly driven as a result of forward movement of the vehicle, they rotate in the direction of the full line arrows shown in Fig. 2. When the vehicle is moving or being driven rearward, the gears rotate in the direction of the dotted line arrows shown in said figure.

The side walls 24 and 26, have bearings 35 and 36 and the former is internally threaded for engagement by the externally threaded boss 7, so that when the latter is turned home, the bearing 35 will endwise abut the housing bearing 4 in tight relation. Likewise, the side walls 25 and 27 are provided with bearings 37 and 38, and the former is internally threaded to engage the external threads of boss 13, so that when the latter is turned home, the bearing 37 will endwise engage bearing 6, of the housing. It will now be clear that the casing is securely supported in the housing axially of shaft 19. In order to prevent the casing from being swung about the axis of shaft 19, due to braking torque, I provide the casing with a lug 39, adapted to be disposed between jaws 40, on the housing, as will now be clear.

Laterally of the gear 30, are filler discs 41 and 42, as will be clearly seen in Fig. 1, and outside these discs are anti-friction bearings, the inner race members being designated at 43 and 44, and being mounted on shaft 19. The outer race members 45 and 46, are disposed in hubs 35 and 37, respectively. Anti-friction balls 47 and 48 are interposed between said race members and thrust nuts 49 and 50, on shaft 19, hold the parts in working position whereby an anti-friction mounting is provided for shaft 19.

Likewise, filler or wearing discs 51 and 52, are fitted laterally of gear 32, and inner race members 53 and 54 are mounted on idle shaft 34 while outer race members 55 and 56 are disposed in bearings 36 and 38. Anti-friction balls 57 and 58, are interposed between said race members to afford an anti-friction mounting for shaft 34. Thrust nuts 59 and 60, hold the parts in position.

Reference will next be made to an improved booster brake mechanism which interdependently coacts with the improved hydraulic brake.

A booster piston rod 61, shown in Fig. 1, extends toward the rear of the mechanism toward the usual band brakes of the vehicle, and the same terminates in an eye 62, for link connection with the usual band brake operating lever, not shown. A booster cylinder 63, shown in Figs. 1 and 2, is disposed in the housing and has an open end 64. The housing is provided with a bearing 65 and the rear end of said cylinder 63, as indicated at 66, abuts against said bearing 65 and is provided with an internal shoulder 67. A locking sleeve 68, is journalled in said bearing 65, and internally telescopes said cylinder 63 and is provided with a retaining flange 69, for engagement with said shoulder 67. A nut 70, threaded on sleeve 68, may be turned home against the bearing 65 to secure the cylinder 63 in the position shown. It may be stated that the booster piston rod 61, in Fig. 1, is shown in a non-braking or band brake position and that the band brakes will be actuated when the rod 61 is moved forwardly. Said rod 61 has a head 71 that is shouldered at 72, to engage the forward end of sleeve 68 and limit movement of rod 61 rearwardly beyond the position shown. A piston gasket 73, is disposed over a pin 74, and is retained in position against head 71, by a piston disc 75, that is held in place by a nut 76, threaded on said pin 74. The parts are so proportioned and arranged as to form a filling or pressure area 77, when the piston is in the retracted position shown. A combined pressure and releasing pipe 78 connects with said cylinder 63, at the pressure area 77, as shown at 79, and leads to a controlling valve which will be later described, and which is shown more particularly in Fig. 2.

I will next describe certain features of construction of the gear cavities in the casing.

It will be noted from Fig. 2, that a horizontal line drawn through the housing, at the right elevation, will intersect shafts 19 and 34, and hence the gears 30 and 32, are horizontally disposed in the casing, and the medial line of mesh engagement would be a horizontal line. While the hydraulic brake shown is adapted for use as a one way brake, as will later appear, it is primarily designed as a two way brake, namely, one that is capable of retarding movement of a vehicle moving either forwardly or rearwardly, which is obviously a great advantage over a one way brake.

In order to make clear certain features about to be described, a brief reference will first be made to certain terminal connections, and specifically, such connections consist of a terminal chamber 80, on one side, or in this construction, above the area of mesh engagement, is adapted to act as a suction chamber when the vehicle is moving forwardly, or as a compression or pressure chamber when brakage is applied against rearward movement of the vehicle. A terminal chamber 81, is adapted to act as a compression or pressure chamber when brakage is applied against forward movement of the vehicle, and as a suction chamber, when brakage is applied against rearward movement of the vehicle. Thus, it will be seen that I have provided opposed chambers in said casing on opposite sides, or in superposed relation with the area of mesh engagement of the gears 30 and 32. As will later appear, these chambers are duplicated, one set being on one side and the other on the remaining side of the gears.

Now reverting to the features of construction of the gear cavities, it will be seen that adjacent the terminal chambers, and extending in opposite directions therefrom, I have provided sealing sections. In cavity 28, the sections are indicated at 82 and 83, and in cavity 29, at 84 and 85. These sealing sections, while not in practice actually engaging the teeth ends, are disposed with such a slight working clearance, that the oil will form an effective seal. The length of these sections is determined by the spacing of the teeth of the gears, and in practice, they have a length such that at least one tooth will always be in coacting relation therewith, or rather, with its respective sealing section. Of course, said sections 82 to 85 may, or might be of such length that more than one tooth would at all times coact therewith, but that would be a disadvantage, since one of the features of these sealing sections is to restrict the area in which oil braking pressure is generated to a minimum square inch area. If the pressure could be built up to a greater distance than shown, a correspondingly greater diametrical thrust would be imposed radially of the gears without any increasing in braking power, which, in some cases, might be destructive. If one thousand pounds pressure is the maximum permitted by the safety valve, and this maximum pressure is limited to one square inch of sealing section surface, the radial thrust, indicated by the arrows, against the gears and shafts thereof, would only be a thousand pounds to the square inch. However, if the pressure built up could extend further around the cavity, to say four square inches, the radial thrust against the gears would obviously be four times as much as it would with the area restricted to a square inch of surface.

By reason of the foregoing, the sealing feature may be termed "a one tooth seal" as the latter is critical, as a limitation, if the best results are to be attained, although of course the invention is not to be limited to a "one tooth seal."

Reference will next be made to another feature of the cavities which is interdependently related to the before mentioned sealing feature.

Between the sealing sections 82 and 83, and on that side remote from the terminal chambers 80 and 81, the peripheral wall 86 of cavity 28, is concentrically recessed to be in actual free clearance with respect to the outer ends of the teeth of gear 31, in fact, such clearance as to amount to a spaced relation, as will be seen from Fig. 2. One feature of this construction is that should the diametrical pressure spring the bearings or shaft 19, the ends of the opposite teeth could not gouge the peripheral wall of the cavity. I have shown the cavity 29, similarly provided with sealing sections 84 and 85, and with a recessed peripheral portion 87, between said sections and on that side remote from the terminal chambers 80 and 81.

However, it may be stated that with the restrictive area of the sealing sections, I have demonstrated in a brake that has been constructed and tested, that no destructive diametrical pressures have been developed. I have indicated by arrows in Fig. 2, extending radially from the sealing sections 82 to 85, the direction of the radial pressure against the gears and it will be clear that such pressure will either be generated adjacent one or the other of the terminal chambers 80 and 81, but not simultaneously in both.

Reference will next be made to another feature of this joint and contiguous construction of the peripheral portions of the gear cavities.

It will be clear that by reason of the fact that high pressure generated in applying braking pressure cannot get outwardly beyond the sealing sections 82 to 85, it necessarily follows that the areas on that side, or on those sides, remote from the terminal chambers 80 and 81, are low pressure areas, or areas which approximate atmospheric, in pressure, by reason of the fact that they are in direct connection with the oil in the case through oil ingress valves and ports during braking operations.

Reference will next be made to the manner in which oil is ingressed to the gears.

It will be understood that wherever I have used the term "oil", in reference to a braking medium, I use it generically to include any liquid other than oil that might be used.

The housing is adapted to contain oil, and the level thereof is advantageously maintained as indicated at A—A, in Fig. 2, which is slightly below the shafts 19 and 34, and sufficiently high to make the gears self priming, as will presently appear.

Oil ingress ports are shown in full lines in Figs. 6 to 8, and preferably, although not in all cases, essentially, I provide duplicate ports that feed to both sides of both gears. Thus, ports 88 and 89, feed to cavity 28, on opposite sides thereof, as shown in Fig. 6. Ports 90 and 91, in Fig. 8, feed to opposite sides of cavity 29. Ports 88 and 89 have terminals 92 and 93, respectively, opening to cavity 28, and ports 90 and 91, have terminals 94 and 95', respectively, which open to cavity 29, as shown in Figs. 6 and 8, and Fig. 2.

The terminals 92 and 94, which are the only two shown in Fig. 2, although all are disposed in the same manner, are elongated and arcuate, and although not absolutely essential, I have shown said ports extending concentrically about the cavities from B to C, in cavity 28, and likewise from D to E, in cavity 29, and a portion of each terminal is below the oil level A—A so that the brake will be self-priming.

At this point in the description, it is important to note that the oil ingress terminals open to the low pressure areas of the cavities; and that they open to said cavities on that side, or on those sides of the sealing sections remote from the side or sides on which the terminal pressure chambers 80 and 81 are located. In addition to the foregoing, it is important to note that the terminals 92 and 95' inclusive, open to the cavities and deliver to the gears laterally of the latter, or in other words, edgewise of the teeth thereof, the spaces or pockets between the teeth opening endwise toward the incoming oil, and that there is no delivery of oil through the terminal chambers 80 and 81. If the oil were delivered through chambers 80 and 81, it would be delivered toward the moving peripheries of the teeth, and hence, centrifugal action would resist ingress of oil therebetween.

It will also be noted that the oil enters near the bases of the teeth, rather than near the outer ends of the latter. Hence, it will be clear that as the oil enters the teeth pockets, near the bottoms thereof, centrifugal action will act to throw the initially entering oil quickly and radially outwardly to fill the radially outer portions of the teeth pockets and then immediately fill to the radially inner portions or bottoms of the teeth pockets.

It is important to note that the elongated ports makes this action possible at high speeds. The self priming feature is very important at slow speeds as it affords a positive feed and this positive feed causes the entering oil quickly to seal all working clearances thereby preventing air from eddying.

It should now be clear that the teeth pockets are free from air, or nearly so, after having passed through mesh engagement, providing the air port is closed on the dis-engaging side of the teeth. The centrifugal action will not create additional suction. If there is some air in the teeth pockets, the entering oil, being heavier, will displace this air until the air itself prevents more oil from entering.

Consequently, instead of attempting to fill the teeth pockets against the action of centrifugal force, the latter is effectively employed as a tooth pocket filling agency.

Reference will next be made to my improved controlling valve and the various functions it performs, initial reference being made to the control of oil ingress.

As shown in Figs. 2, and 9 to 16, the closure of said valve, as indicated at 95, is rotative, or oscillative, in a valve body 96, which is shown open at both ends and which is submerged in the oil at all times so that it will be exposed to a uniform temperature and hence cannot bind as a result of any difference of contraction and expansion of one part with respect to the other. The bore of said valve body 96, is indicated at 97 and 98, in Fig. 2. The valve closure has an ingress controlling section 99, the opposite ends of which close ports 88 and 89, when the valve closure is in the Fig. 6, position, and partly or fully open said ports when the valve closure is in the Figs. 7 and 8, positions. When said ports are opened, oil flows into end 97 and upwardly through ports 88 and 89, as will be seen from Figs. 7 and 8. Said closure has a section 100, which controls ports 90 and 91, as shown in Fig. 8, and when said section is in the Fig. 8, position, oil is free to enter ports 90 and 91, dependent upon the extent of opening movement, and pass upwardly through terminals 94 and 95', into the pockets of gear 32, as will now be clear. It will be obvious that as the sections 99 and 100, are integral with the valve closure 95, they will function simultaneously in opening ingress of and closing off ingress of oil to the gears.

In Figs. 2 and 5, I have illustrated a means of limiting oscillatory movement of the closure 95, and the same may, as shown, consist of a stop pin 101 mounted in a portion of the closure 95, and having a free end movable in an arcuate slot 102, in the valve body 96. In the Fig. 5, position, the valve closure is shown arrested in the non-braking position shown in Fig. 2. If the valve closure 95 is rotated to the Fig. 8, position, the pin 101 would engage the upper terminal 103, of slot 102, the lower terminal being indicated at 104.

Said controlling valve has a valve stem 105, which extends through a gland bearing in the housing, as shown in Fig. 2, which consists of a female member 106, suitably fixed in the housing, and a male member 107, threaded into the female member to compress an interposed packing 108. A collar 109 is shown pinned to said stem 105 and engaging the gland member 106. An arm 110, mounted on stem 105, outside the housing, is adapted for link connection with a suitable brake actuating treadle accessible to the driver, and not herein shown. Viewing Figs. 5 and 6 to 12, inclusive, the closure is rotated in a contraclockwise direction from the non-braking adjustment shown in Figs. 5, 6, 9 and 10, toward various braking adjustments as shown in Figs. 8, 13 and 14.

Reference will next be made to that portion of the controlling valve that functions to control air passage, and also to the various air passage ports, to and from the hydraulic brake, and subsequently, reference will be made to that portion of the controlling valve that coacts with the booster brake means.

Referring to Figs. 2 and 9, it will be seen that compression egress ports 111 lead from terminal chambers 81 to the valve closure 95, and it may be informative to state, at this point in the description, that these ports are always egress and never ingress ports, as far as the oil is concerned. Further, these ports 111, from the area of compression, or rather inclusive thereof, constitute the entire area in which oil is compressed down to the valve closure 95. Said valve closure 95 has what will be termed a connecting port 112, which, in the Fig. 9, position, which is a non-braking position, is in full registry with the egress ports 111. Said valve closure 95, also has what will be termed an exhaust port 113, which leads diametrically away from said connecting port 112 to the periphery of said closure 95. Said port 113, also has a lap extension 114, the purpose and function of which will later appear. A final exhaust port, which is always a non-pressure port, comprises a port 115, leading from the periphery of the closure 95, to a port 116, which has, as shown in Fig. 2, a pipe extension 117, which latter extends laterally of the casing and above the oil level A—A and thereby discharges into the air in the housing. In non-braking adjustments, only air discharges or ingresses through 117 but in a braking adjustment, oil will also discharge therethrough, as will later appear. At this point it is desired to state that safety valves 118', are provided which communicate with ports 111 and which discharge into the housing. It may be assumed, for convenience, that these valves 118', are set to relieve braking pressure when the latter amounts to one thousand pounds to the square inch, although this arbitrary amount will of course be varied under different conditions of installation.

Next referring to Fig. 10, it will be seen that terminals 80, open to compression egress ports 118 which latter terminate at the valve closure 95 at a point remote from the location of ports 111, because Fig. 10, is taken on a different section from Fig. 9. It will also be understood that while for convenience of designation, I have termed ports 111 and 118 compression egress ports, which they are, when braking application is made against forward and rearward movement of the vehicle, respectively, still, they are egress ports or ingress ports when air is flowing through them in a non-braking adjustment, in the absence of oil pressure or compression. Said valve closure 95, has a connecting port 119, which is in full registry with ports 118, in the non-braking adjustment, and an exhaust port 120, leads from port 119 to a final exhaust port which is always a non-pressure port, and which consists of a port 121, leading to a port 122, that has a pipe extension 123, opening to the air in the housing above the oil level A—A as shown in Figs. 1 and 2. Said port 120, has a lap extension 124, similar and for a similar purpose as the lap extension 114.

It will now be clear that in a non-braking adjustment and with the vehicle moving forwardly, and the gears 30 and 32 rotating in the direction of the full line arrows, (Fig. 2), air will be drawn in through terminals 80, which are then the suction terminals, from pipe 123, to port 122 and 121 and through port 119, to ports 118 into terminals 80. The air from terminals 80 will be carried around by the gears 30 and 32 and forced out through terminals 81, to ports 111, port 112, to port 113, and through ports 115 and 116 and out through pipe 117 and finally therefrom into the air area of the housing. As the oil ingress ports 88 and 89, 90 and 91 are closed, in the non-braking adjustment, no oil can enter the brake. The path of the air when the vehicle is moving backwardly, will be clear from the foregoing.

It will now be clear that in a non-braking adjustment, there is an endless flow of air through the brake, irrespective of the direction in which the vehicle is moving, and that the oil is quiescent and does not form a drag by idling through the gears. To take care of expansion and contraction of the air in different temperatures, I provide a breather in the top of the housing as shown in Fig. 2. An opening 125, in the housing wall, is suitably flared at 126 and any form of screen 127 is disposed on a suitable seat 128. The projection is in the form of a hollow boss 129, open at its top, and over which may fit any suitable closure, such as a part of the housing suspension frame 130. Any suitable material such as wool of the desired kind, as indicated at 131, may be disposed upon the screen 127, and holes 132, afford ingress and egress of air to and from the housing, as will now be clear. This expedient, prevents the generation of any substantial pressure in the housing above the oil level, and also prevents ingress of foreign matter to the brake.

Reference will next be made to that portion of the controlling valve which controls the booster brake means.

Referring to Figs. 2, 3 and 5, it will be seen that the valve body 96, has a booster portion 133 depending therefrom. In this portion 133, is a combined pressure and releasing port 134 which is at all times in communication with the combined pressure and releasing pipe 78. A head 135 is suitably mounted on portion 133, and this head has a port 136, with which pipe 78 is directly connected, said port 136 being at all times in full registry with port 134, or in other words, in full communication therewith.

As will be seen in Fig. 2, port 134 has an upwardly extending terminal 137, which registers with a discharge cavity 138, in closure 95, this cavity also being shown in Fig. 5. Thus, when the closure 95 is in the non-braking position, as shown in said figures, oil pressure in the booster cylinder 63, in the area 77 (Fig. 1) can release into the reservoir formed by the housing. The piston rod 61, is actuated toward a releasing position, as shown in Fig. 1, by the usual spring return on the band brakes, not shown, or by any other spring means that may be desired.

Reverting to the valve body portion 133, and more particularly to Figs. 3 and 4, the cap or head 135 is provided with a connecting cavity 139, of the contour clearly shown in these figures, spring sockets 140 and 141 intersecting the same. The outer edge wall 142, of said head, fits tightly against the end of valve portion 133, and the head is suitably secured to said portion 133. Forward and rearward braking booster pressure or actuating ports 143 and 144, respectively, are formed in portion 133 and said ports have ball valve seats 145 and 146, respectively. Ball valve closures 147 and 148 are urged against said respective seats by springs 149 and 150, respectively, which are disposed in the spring sockets 140 and 141, respectively. Hence, the pressure ports 143 and 144 are normally closed and cannot be opened unless the pressure therein overcomes the springs 149 and 150, and only one of said ports is active at one time, never both thereof. However, when either valve 147 or 148 is unseated, its respective port will be in communication with pipe 78, through said connecting cavity 139.

Reference will next be made to the manner in which the ports 143 and 144 are controlled by the valve closure 95.

At the right of Fig. 3, the port 143 has an upward extenison 143', shown in Fig. 9, which intersects the bore 98 of valve body 96, and which, in said figure, is shown closed by closure 95. However, closure 95 has a booster pressure port 151 provided with a lap extension 152, and the former connects with ports 112 and 113. When the closure 95 is rotated to the Fig. 13, position, oil in ports 111 that is congested by reason of brakage against forward movement of the vehicle, may pass into lap 114, port 113 and port 112, to port 143'. In order to balance the valve closure 95 against binding pressure, it is clear that congested oil may pass into lap 152, port 151 and thence into port 112, to reach port 143'. Thus, congested oil from both ports 111, finds egress into port 143'. This oil under pressure passes through port 143, unseating ball valve 147 (Fig. 3) and passes through cavity 139 and port 136, into pipe 78 and thence to the booster cylinder 63. Of course, in this adjustment as shown in Fig. 13, cavity port 138 is out of registry with port 134.

Having shown the path of congested oil to the booster when braking against forward movement of the vehicle, I will next show the path of congested oil to the booster during braking against rearward movement of the vehicle.

Port 144, in Fig. 3, has an upward extension 153, shown in Fig. 10, which intersects the valve body bore 98. Valve closure 95, has a booster port 154 which connects with port 119. Thus, in the Fig. 14 position, when oil is congested due to brakage against backward movement, the oil congested in port 118, to the left of Fig. 10, will flow as follows:—

From port 118, the oil enters lap 124 and flows through port 120 to port 154 and then into port 153, whereupon it enters port 144, flowing to the left of Fig. 3 against and unseating ball valve 148. The oil is then free to pass through cavity 139 into port 136 and out through pipe 78 to booster cylinder 63, to actuate the band brakes, as will now be clear.

The foregoing general description of operation of the several integers of the invention will facilitate an understanding of the general description of operation which I will now make relative to different operative conditions.

Assuming that the vehicle is in a non-braking adjustment with the valve closure in the position shown in Figs. 2, 5, 6, 9 and 10, and the vehicle moving forwardly, the gears 30 and 32 will revolve in the full line arrow direction making 80 the suction terminals and carrying the air around to and forcing it out through terminals 81. As heretofore described, air will supply terminals 80 by passing in through pipe 117 and air from terminals 80, will discharge through pipe 123. If the vehicle is backing up, under a non-braking adjustment, air will enter through pipe 123 to terminals 81, which will now be the suction terminals by reason of the gears 30 and 32 revolving in the direction of the dotted arrows. The gears will carry the air around and discharge it out through terminals 80, and through pipe 117, as will now be clear. Any residue oil left in the gears from a previous braking application, will be quickly discharged with the air, and both oil and air are discharged into the housing above the oil level.

In practice, as far as I can determine, the air flow satisfies suction so responsively that oil in the ports 88 and 89, and 90 and 91, between the terminals 92 and 93 and valve 99, and between terminals 94 and 95' and valve 100, is not drawn out of said ports but remains therein, supported by the valves so that when the next braking application is made, there is already a supply of oil in said ports at high levels, thereby insuring quick oil ingress into the gears.

Now it will be assumed that the vehicle is advancing and an average braking application was made so that the valves 99 and 100 were moved into the position shown in Fig. 7, in which event almost a full passage opening would be afforded the oil up through ports 88—89 and 90—91 to both sides of both gears. This quick opening is desirable to quickly flood the gear pockets and it is an object to afford a considerable volume opening even in light braking applications. Thus, with the valves in the Fig. 7 position, and with the oil already standing in the ports, as previously described, a very quick supply will be delivered to the gears, and by reason of the centrifugal action of the latter, quickly filled teeth pockets will result, aided by gravity flow from the head level, whereby congestion will immediately take place in terminals 81. At this point, it is desirable to emphasize the fact that the terminals 92 to 95', where oil is initially admitted or in other words, where the oil enters directly from ports 88 to 91, are very closely disposed adjacent terminals 81, which are always the compression terminals when brakage is applied against forward movement of the vehicle. Therefore, those teeth pockets closely adjacent said terminals 81, are directly filled immediately, and it is not necessary for the teeth to carry or advance the oil but a very short distance before congestion results.

Having shown how the oil ingresses to the gears in making a braking application, I will next show how egress of the oil is controlled to make the braking application effective to various degrees, it being understood that I am still dealing with a braking application against forward movement of the vehicle.

I will first explain what would be a light range of braking and will refer to Fig. 15, wherein it will be seen that closure 95 has been turned contra-clockwise from the Fig. 9, position, sufficiently so that port 112 has partially cut off egress of oil from the gears downwardly through ports 111 from terminals 81, adjacent to which the compression is generated. Hence, the oil cannot egress from between the gears as fast as it ingresses to them and consequently a light brakage application is made. The oil will flow upwardly from port 112 through port 113, into port 116, and will be discharged out through pipe 117. Now it will be understood that as long as port 113 is to any extent in registry with port 115, suction generated adjacent terminals 80, would have a tendency to draw air into said terminals through pipe 123, and its described path, to terminals 80. To a very limited extent, such air ingress will take place, but it will not work any disadvantage as it mixes with the oil that is being carried or advanced by the gears toward terminals 81, and such ingressing air will be discharged with the oil through pipe 117.

It may be informative to state that in actual practice, I have found that approximately five thousandths of an inch clearance is feasable between the ends of the teeth and the sealing sections 82 to 85, and that approximately four thousandths of an inch clearance is practical on each side of gears 30 and 32. This clearance, or any greater clearance that may be caused by wear, will be quickly sealed by the first oil that enters, due to the self priming feature coacting with the novel form of parts heretofore described. Therefore, it will be seen that precision working conditions are not sought as they could not be maintained in such a mechanism as a vehicle brake without great expense of upkeep. Consequently, even with the oil seal, the parts that coact are not intended to be air tight. Even if there is some slippage of oil, no objectionable results will follow because pressure is built up in such volume and with such rapidity, that a slight slippage or leakage of oil passed coacting parts would not in practice be appreciable. Therefore, the brake would be efficient even in the presence of some very considerable wear such as might greatly increase the original clearances. Even after air ingress to the brake has been completely shut off, or supposedly so, a slight air leakage into the oil path during brakage may occur, and the valves have not been fitted air tight, as actual practice with a full size working brake has proven that such air tight fits are not essential, and in all probability, could not be maintained without involving great expense of upkeep.

It will be further stated that the valves 99 and 100 are so constructed, and are of such extensively greater area than the terminals or the egressing valve areas, that the slightest movement of said valves 99 and 100 will open an oil ingressing volume greatly in excess of the oil egressing volume. Thus, when the egressing adjustment as shown in Fig. 15, with its relatively small area portage, is in the restricted egress position shown in said figure, the valves 99 and 100 will be in the dotted line position shown in Fig. 7. Thus, in practice, there is what would amount to, a slightly advance opening of valves 99 and 100, compared to the closing movement of the egressing portage, although the valve structure 95 is actually an integral structure. This difference in portage size, can readily be seen by reference to Fig. 2.

Again reverting to Fig. 15, to finish the description of this first braking stage, it will be clear that as closure 95 is moved in a contra-clockwise direction to a further extent, an increased braking application will result as the port 112 will gradually restrict egress. From the half way position shown in Fig. 15, to a full closure of egress out through port 115, it may be stated that such adjustment will amount to a relatively high pressure braking action, the first half movement from the Fig. 9, position, to the Fig. 15, position, being a range of light pressure braking action. At this point, it may be informative to state that no pressure can as yet enter the booster brake. When the valve closure 95 has been moved to the Fig. 11, position, all egress through port 115 will have been cut off and presumably no air at all can enter pipe 123, and I enter into a higher pressure braking application stage.

It will be clear that safety valve 118' always acts as an egress port, opening at a determined pressure independently of other ports and their opening. Therefore, I reach a maximum brakage power when valve or valves 118' open and should further brakage be necessary, I rely upon the booster band brake operating means.

It may be stated that in the Fig. 11, position, brakage is applied to the gear maximum, or in other words, as far as the gears 30 and 32 can apply brakage, as only a minimum of oil can egress through laps 114 and 152, in this position. It will also be clear that such a minimum of oil can egress to port 143, in this position, as would hardly be effective to operate the booster, unless the valve closure 95 was held in such position until an accumulation of egressing oil formed. The reason why the wheels of the vehicle will not be locked through the differential, when the valve closure 95 is in the Fig. 11, position, or even if the portage were so arranged that a complete stoppage of egress was effected, is because the safety valves 118', shown in Fig. 9, would release accumulated pressures above one thousand pounds per square inch, or at any other predetermined maximum for which they were set. I also wish to state that when the valve closure 95 is in the Fig. 11, position, the ingress valves 99 and 100, are in the full line position shown in Fig. 7.

In further description of braking against forward vehicular movement, I will next describe how additional brakage may be applied.

Before entering into this further description of additional brakage, I desire to point out a characteristic of this and other hydraulic brakes that I have invented and built along broadly similar lines. At any speed over approximately eight miles an hour, this brake satisfies all requirements, and the greater the speed, the more responsive is its braking action. Therefore, at any speed greater than this approximate minimum, which minimum may vary somewhat as regards trucks, stages and passenger automobiles because of the wide difference in drive shaft speed and other factors, I find that no emergency or booster brakage is necessary. In fact, better results can be obtained by not using the booster, except perhaps in some kind of extreme emergency.

However, at speeds below the stated minimum, and especially when the vehicle is being driven very slowly in congested traffic where it is frequently stopped and started in brief periods of time, the booster feature is highly important as the valve 95 can be adjusted to an extreme position, about to be described, and egressing oil will quickly operate the band brakes. In most any motor vehicle, the drive shaft speed, even at an extremely slow movement of the vehicle, is sufficient to build up oil pressure sufficient to stop the vehicle or bring it within the desired speed, as at low speeds, the vehicle is much more easily controlled and arrested than at relatively high speeds.

Reference will now be made to Fig. 13, in which the valve closure is moved or advanced to a final position such that the pin 101, in Fig. 5, will engage the upper stop end 103, of the slot 102.

By reference to Fig. 13, it will be seen that oil under compression by the gears 30 and 32, can egress down through ports 111, into laps 114 and 152, and ports 113 and 151, respectively, and thence into port 112, one end of the latter being in substantially full registry with port 143', leading to port 143. Thus, oil will unseat ball valve 147, and pass through pipe 78, to the booster cylinder 63, and actuate the piston therein and apply the band brakes of the vehicle to bring the latter down to a slower movement, or to a position of rest against forward movement. In this position of closure 95, the valves 99 and 100, will be in the full open position shown in Fig. 8.

It will now be clear that just as soon as brakage is released, either fully by restoring the valve closure 95, to the Fig. 9, position, or even to the Fig. 11, position, the oil under pressure in area 77, of the booster cylinder 63, will be free to release back through pipe 78 and through port 134, and out through releasing cavity 138 (Fig. 2) to the reservoir. While all the oil in cylinder 63 may not be returned, all that is under pressure caused by restoration of the booster piston, will be released so that nothing can obstruct the booster piston from being restored to the Fig. 1, position. Further, just as soon as pressure has been released against ball valve 147, its spring 149 will close the same, thereby preventing return of the pressure in the booster cylinder to the oil brake, should the pressure in the former exceed that of the latter.

Reference will next be made to the manner in which brakage is applied against rearward movement of the vehicle.

In applying brakage against rearward movement, the valve closure 95 is rotatively adjusted in the same direction as it is moved in applying brakage against forward movement of the vehicle, namely, contra-clockwise, viewing Figs. 9 to 14.

Fig. 10, shows the closure 95 in a non-braking adjustment and is therefore a view companion to Fig. 9. In the Fig. 10 position, the vehicle is free to move rearwardly and the gears 30 and 32 would rotate in the direction of the dotted line arrows in Fig. 2. Oil ingress is closed, and the gears 30 and 32 would draw in air through terminal 81 and discharge air through terminal 80. The air drawn in, would ingress through pipe 117, port 116, port 115, port 113, to port 112, and the latter would deliver to ports 111 to terminals 81, as shown in Fig. 9. The air discharged through terminal 80, would pass into ports 118, of Fig. 10, and into port 119, to port 120, to port 121, to port 122 and out pipe 123 to the air space above the oil level in the reservoir.

In applying brakage against rearward vehicular movement, where light brakage is desired, the valve 95 may be moved to the Fig. 16 position wherein it will be seen that port 119 will partially cut off egress of the oil down through ports 118, and that such egressing oil will pass from port 119, into port 120, and to port 121 and port 122 and out through pipe 123. In this position of valve 95, which corresponds to the dotted line position in Fig. 7, the valves 99 and 100 have been moved to permit ingress of oil to the teeth pockets, as will now be clear. As the valve 95 is further moved, and while port 120 is to any extent in registry with port 121, there will be an increase of brakage, as will now be clear.

Just as soon as registry has been cut off between ports 120 and 121, and port 119, has moved out of registry with ports 118, then all air that might enter the gears through terminals 80, will have been cut off, and brakage is correspondingly increased. However, as this adjustment is attained, as shown in Fig. 12, the lap 124 will have begun to register with the left hand port 118, and the port 154 will have begun to register with port 153, leading to port 144. At this point, it is desired to state that safety valves may be provided for ports 118, the same as has been shown for ports 111, however, rearward movement of a vehicle is seldom made at a rapid speed and is correspondingly more easily controlled and arrested. Therefore, in practice, I have not found it necessary to so equip the ports 118, although in view of this disclosure, it would be within the province of the invention so to do. Thus, I have shown how first and second stage brakage applications can be made against rearward movement of the vehicle, the same as against forward movement thereof.

Now if the vehicle were backing up very slowly, or if for any other reason, it was desired to apply band brakage, the valve 95 could be moved directly to the Fig. 14, position, in which event full registry would be effected between ports 154 and 153, so that the egressing oil passing from the left hand port 118, could readily flow into port 144, through the now clearly described intermediate portage, and unseat ball valve 148, in Fig. 3, and pass to booster cylinder 63, through pipe 78. Just as soon as valve 95 was restored, to such an extent as to cut off registry between ports 154 and 153, then ball valve 148 would be seated by its spring 150, or before, depending on the relation between the booster pressure and the brake pressure. Oil under pressure in the booster cylinder would be released through pipe 78, when port 134 and cavity 138 (Fig. 2) came into registry, thereby causing return of the oil in the booster cylinder into the reservoir, as will now be clear.

It will be seen that when the valve closure 95 is in the Fig. 13, position, for applying full brakage against forward movement of the vehicle, that port 154, in Fig. 14, which is a companion figure to Fig. 13, is in full registry with port 153. However, as the gears 30 and 32, in this stage of braking adjustment are rotating in the direction of the full line arrows, the terminals 80 will be the suction terminals and therefore no pressure medium can flow from left hand port 118, into port 144. As the necessity for balance of valve 95 is not so urgent in brakage against rearward movement of the vehicle, I have not provided port 154 with a lap such as port 151 is equipped, although such provision may be made, in the light of this disclosure, and would be within the province of this invention.

It will also be noted that in view of this disclosure, both the timing and sequence of portage registry may be altered within the province of this invention.

The portion 133, of the controlling valve, may be termed the booster portage structure, and the port 143 thereof may be termed the forward pressure braking port while the port 144 may be termed the rearward pressure braking port and the port 134 may be termed the releasing port which is common to the afore mentioned ports in the sense that it is always accessible for discharge from cylinder 63, for the oil that has entered the latter from either of the foregoing ports.

In order to release trapped oil from the bottoms of the gear teeth after mesh engagement has closed all other egress, I provide grooves 151' leading to the normally low pressure side of mesh engagement, or in other words, that side on which terminals 80 are located.

It is believed that the structure, functions and operation will be fully understood from the foregoing description, and while I have herein shown and described one specific form of the invention, I do not wish to be limited thereto except for such limitations as the claims may import.

I claim:—

1. In a vehicular hydraulic brake, vehicularly operated gears for building up pressure against either forward or rearward movement of the vehicle, a casing enclosing said gears and having chambers on opposite sides of the point of mesh engagement of said gears and either chamber being adapted to act as a suction or pressure chamber dependent upon the direction of rotation of said gears, and said casing having oil ingress ports delivering circumferentially of said gears located between said chambers, and adapted to supply said gears with oil irrespective of the direction of rotation of said gears.

2. In a vehicular hydraulic brake, a gear casing having a suction and a pressure chamber, meshing gears in said casing adapted to be driven by the vehicle and disposed in said casing to locate their meshing portions between said chambers, and said casing having oil ingress ports opening to said gears remote from said chambers.

3. In a vehicular hydraulic brake, a gear casing having a suction and a pressure chamber, meshing gears in said casing adapted to be driven by the vehicle and disposed to locate their meshing portions between said chambers, and said casing having oil ingress ports opening to said gears laterally of the teeth thereof and circumferentially between said chambers.

4. In a vehicular hydraulic brake, a casing having opposed chambers either of which is adapted to act as a suction or pressure chamber and said casing having companion gear cavities intersecting said chambers and having circumferential gear enclosing portions, vehicle driven gears in said cavities having mesh engagement between said chambers, said enclosing portions having relatively restricted sealing sections adjacent said chambers in close clearance engagement with the teeth ends and intermediate sections in spaced relation from the teeth ends to form low pressure areas between said sealing sections, and said casing having oil ingress ports opening to the gears in said low pressure areas.

5. In a vehicular hydraulic brake, a casing having opposed chambers either of which is adapted to act as a pressure chamber and said casing having companion gear cavities communicating with said chambers, and vehicle driven gears in said cavities having mesh engagement between said chambers, said cavities having peripheral sealing sections adjacent said chambers and of sufficient length always to coact with at least one approaching or receding tooth of each gear to prevent generated pressure in said chambers from extending beyond said sealing sections, thereby limiting radial pressure against said gears to that square inch of area of said sealing sections exposed to such pressure, and said casing having oil ingress ports opening to said gears on that side of said sealing sections opposite said chambers.

6. In a vehicular hydraulic brake, a casing having opposed chambers either of which is adapted to act as a pressure chamber and said casing having companion gear cavities communicating with said chambers, and vehicle driven gears in said cavities having mesh engagement between said chambers, said cavities having peripheral portions in free clearance spaced relation from the teeth ends of said gears forming low pressure areas and said cavities having peripheral sealing sections adjacent said chambers and of sufficient length always to coact with at least one tooth of each gear to prevent generated pressure on the chamber side of said sealing sections from spreading into said low pressure areas, thereby limiting radial pressure against said gears to that area of the sealing sections exposed to such pressure, and said casing having oil ingress ports opening to said low pressure areas.

7. In a vehicular hydraulic brake, a casing having terminal pressure chambers, meshing gears in said casing for building up braking pressure peripherally of said gears in either of said chambers, and said casing having sealing sections in opposed relation to said chambers and of sufficient area always to coact with at least one tooth of each gear that is traversing such section to thereby prevent passage of pressure past such tooth, and said casing being peripherally recessed between said sealing sections whereby pressure exerted radially against said gears will be restricted to that area of said sealing sections between the teeth coacting therewith and the adjacent terminal pressure chambers.

8. In a vehicular hydraulic brake, a casing having terminal pressure chambers, gears disposed in said casing for building up braking pressure in either of said chambers, a controlling valve, said casing and controlling valve having portage for permitting ingress of oil to said gears independently of said chambers, and said casing and valve having portage for restricting egress of oil from either of said chambers to apply brakage against forward or rearward movement of the vehicle.

9. In a vehicular hydraulic brake, a casing having terminal chambers, gears in said casing for building up braking pressure in either of said chambers, a controlling valve, said casing and valve having portage for restricting ingress to said chambers to air, and said casing and valve having portage for admitting oil to said gears at points remote from said chambers.

10. In a vehicular hydraulic brake adapted to act through the differential of the vehicle, a casing, vehicle driven gears in said casing for building up braking pressure, a band brake operating means, and a controlling valve for restricting egress of built up pressure by said gears to apply brakage through the differential or ingress such built up pressure to said band brake operating means to actuate the latter, for applying band brake to the vehicle irrespective of the direction of movement of the latter.

11. In a vehicular hydraulic brake adapted to act through the differential, a housing, a casing within said housing, vehicle driven gears in said casing for building up braking pressure, a band brake operating means mounted in said housing, a controlling valve in said housing for restricting egress of such built up pressure to apply brakage through the differential and ingressing such pressure to said band brake operating means to supplement or substitute for the brakage of said pressure through the differential.

12. In a vehicular hydraulic brake adapted to act through the differential, a housing adapted to contain an oil body, a casing in said housing, vehicle driven gears in said casing for building up braking pressure, a band brake operating means mounted in said housing and adapted to discharge oil therein, a controlling valve in said housing for admitting oil to said casing and restricting egress of built up pressure by said gears to apply brakage through the differential, or ingressing such egressing pressure direct to said band brake operating means to actuate the latter at slow vehicle speeds.

13. In a vehicular hydraulic brake adapted to act through the differential, a housing adapted to contain a body of oil, a casing with said housing, vehicle driven gears in said casing for building up braking pressure, a band brake operating means, a booster portage structure connected with said means and having forward and rearward pressure braking ports and a releasing port common thereto, and a controlling valve for restricting pressure egress from said gears to apply brakage irrespective of the direction of movement of the vehicle, or directing such pressure egress from said gears into the corresponding forward or rearward pressure port of said portage structure to actuate said means and apply band brakage irrespective of the direction of movement of the vehicle.

In witness whereof, I have hereunto set my hand.

PAUL R. KAUFFMAN.